United States Patent [19]

Tsuchida et al.

[11] Patent Number: 4,618,640

[45] Date of Patent: Oct. 21, 1986

[54] HOT-MELT ADHESIVE COMPOSITIONS COMPRISING A PARTIALLY (FUMARIZED AND/OR MALEINIZED) DISPROPORTIONATED ROSIN ESTER TACKIFIER

[75] Inventors: Seiichi Tsuchida, Sakai; Yoshihiro Kodama, Kobe; Hiroari Hara, Osaka, all of Japan

[73] Assignee: Arakawa Kagaku Kogyo Kabushiki Kaisha, Osaka, Japan

[21] Appl. No.: 717,175

[22] PCT Filed: Jul. 9, 1984

[86] PCT No.: PCT/JP84/00351

§ 371 Date: Mar. 20, 1985

§ 102(e) Date: Mar. 20, 1985

[87] PCT Pub. No.: WO85/00615

PCT Pub. Date: Feb. 14, 1985

[30] Foreign Application Priority Data

Jul. 27, 1983 [JP]  Japan ................................ 58-138526

[51] Int. Cl.[4] ............................ C09J 3/14; C09J 3/26; C08L 23/08; C08L 93/04

[52] U.S. Cl. .................................... 524/272; 524/270; 524/271; 524/274; 524/562; 524/563; 525/54.45

[58] Field of Search ............... 524/270, 271, 272, 274, 524/562, 563; 525/54.45

[56] References Cited

U.S. PATENT DOCUMENTS

| | | | |
|---|---|---|---|
| 3,632,540 | 1/1972 | Unmuth et al. | 524/274 |
| 3,658,740 | 4/1972 | Marrs et al. | 524/274 |
| 4,248,770 | 2/1981 | Matsuo et al. | 524/270 |
| 4,284,541 | 8/1981 | Takeda et al. | 524/272 |
| 4,302,371 | 11/1981 | Matsuo et al. | 524/274 |

FOREIGN PATENT DOCUMENTS 1033115  6/1966  United Kingdom .

OTHER PUBLICATIONS

Derwent Abstract 16931e/09 Nissan Motor KK (Jan. 1982) J57014675.

*Primary Examiner*—Herbert J. Lilling
*Attorney, Agent, or Firm*—Larson and Taylor

[57] ABSTRACT

A hot-melt adhesive composition containing an ethylene copolymer, wax and a tackifying resin as major components, the composition being characterized in that the tackifying resin is partially fumarinized and/or partially maleinized, disproportionated rosin ester.

14 Claims, No Drawings

HOT-MELT ADHESIVE COMPOSITIONS COMPRISING A PARTIALLY (FUMARIZED AND/OR MALEINIZED) DISPROPORTIONATED ROSIN ESTER TACKIFIER

Field of the Invention

This invention relates to hot-melt adhesive compositions, and more particularly to novel hot-melt adhesive compositions containing a specific type of stabilized rosin ester as a tackifying resin and outstanding in heat resistance and setting property.

BACKGROUND ART

Hot-melt adhesives are solid at an ordinary temperature. In use, they are thermally melted, applied to substrates and set by being cooled to cause adhesion, whereby they exhibit bond strength.

These hot-melt adhesives have numerous advantages of having 100% solids content and being substantially free of fire hazards, capable of setting in a shorter period of time and easy to handle. Because of these advantages and with rapid spread of applicators, the hot-melt adhesives have found prevalent use in various fields such as bookbinding, packaging, woodbonding and the like.

Generally these hot-melt adhesives comprise: a base polymer such as ethylene-vinyl acetate copolymer (EVA), ethylene-acrylate copolymer and like ethylene copolymers, polyethylene, thermoplastic rubber, polyamide, polyurethane, polyester and like thermoplastic high-molecular-weight polymers, etc.; a tackifying resin; and a viscosity-controlling agent such as various kinds of waxes. Widely used as the base polymer are ethylene copolymers such as EVA, ethylene-acrylate and the like because they give adhesives favorable in respect of flexibility, thermostability, costs, etc. Useful tackifying resins include natural resins such as rosin resin and terpene resin and petroleum resins.

Among these tackifying resins, common rosin resins have been predominantly used because they give adhesives high in adhesive property and cold resistance. But they can not provide adhesives satisfactory in thermostability and setting time. The rosin resin has been disproportionated or hydrogenated or mixed with an expensive antioxidant to overcome the defect of low thermostability among the defects of rosin resin. However, the disproportionation or hydrogenation results in the production of adhesives as poor in setting property as those prepared from common rosin resins, although having an improved thermostability. Further a hydrogenated resin involves economical disadvantage, hence unfit for practical use. The use of antioxidant encounters other drawbacks of manufacturing adhesives unacceptable in coloration and odor, hence undesirable.

Terpene resins, chiefly terpene-phenol resins, give adhesives excellent in thermostability and setting time, but unsatisfactory in heat resistance, cold resistance and odor.

Use has been proposed and made of petroleum resins prepared by polymerization of inexpensive petroleum fractions as tackifing resins in place of rosin resins and terpene resins. While relatively good in setting property, the adhesives prepared from petroleum resins are inferior to those from the natural resins in compatibility, thermostability, adhesive property, cold resistance, etc.

As stated above, even if incorporating any of conventional tackifying resins, hot-melt adhesives are poor in at least one of thermostability, compatibility, adhesive property, setting time and cold resistance. Hot-melt adhesives satisfactory in all of these characteristics have not been developed yet.

Directing attention to stabilized rosin esters relatively superior in these characteristics to other conventional tackifying resins, we conducted extensive research to develop novel and useful hot-melt adhesives free of the foregoing drawbacks. As a result, we unexpectedly found that a specific type of stabilized rosin ester used as the tackifying resin gives hot-melt adhesives free of all the foregoing drawbacks and particularly the poor setting property in which known stabilized rosin esters have the most serious drawback. Based on this novel finding, we have accomplished this invention.

DISCLOSURE OF THE INVENTION

This invention provides hot-melt adhesive compositions containing an ethylene copolymer, wax and a tackifying resin as major components, the compositions being characterized in that the tackifying resin is partially fumarinized and/or partially maleinized, disproportionated rosin ester (hereinafter simply referred to as "stabilized rosin ester").

The compositions of the present invention have all of the fundamental properties required of hot-melt adhesive compositions, namely: (1) being thermally stable and free of coloration and skinning, (2) involving no phase separation due to good compatibility of the resin with the base polymer and the wax, (3) neither giving off odor during application of adhesives nor adversely affecting the work environment, (4) having good adhesion to various substrates, and (5) possessing sufficient flexibility at low temperatures (hereinafter referred to as cold resistance). In addition, the present compositions have markedly improved properties, namely: (6) being outstanding in adhesive property at high temperatures (hereinafter referred to as heat resistance) and (7) being excellent in setting time for adhesion. With these properties, the compositions of the present invention are well suited and very useful in the present situation wherein it is desired to develop adhesives excellent in heat resistance and setting time which are now regarded as more important properties among the above characteristics in view of the recent development of packaging, assembly and the like. Especially the stabilized rosin ester contained as the tackifying resin in the present composition gives adhesives superior to those prepared from conventional rosin resins in thermostability, setting property, etc. and to those from terpene-phenol resin in heat resistance, cold resistance, odor, etc. Heretofore tackifying resins with these properties have not been developed.

It is critical in this invention that the stabilized rosin ester included as the tackifying resin in the present composition be partially fumarinized and/or partially maleinized, disproportionated rosin ester. Such resin can be prepared according to conventional processes, for example, by reacting partially fumarinized rosin and/or partially maleinized rosin with alcohol to give a rosin ester which is then disproportionated. The partially fumarinized rosin and partially maleinized rosin used in the process are not limited to particular kinds and can be prepared by conventional fumarinization or maleinization methods. For example, these partially fumarinized or maleinized rosins can be prepared by mixing a rosin as the starting material with fumaric acid or maleic anhydride and heating the mixture for fumarinization or maleinization to give an addition product of the Diels Alder type. The rosin used as the starting material can be any of gum rosin, wood rosin and tall oil rosin. The ratio of fumaric acid or maleic anhydride to be used relative to the rosin in the reaction is limited in view of the compatibility of stabililized rosin ester (obtained by subsequent reaction) with the ethylene copolymer, the adhesive property of the adhesive, etc. Generally 1.3 to 20 mole %, preferably 2.6 to 13 mole %, of the fumaric acid or maleic anhydride is used based on the rosin. If less than 1.3 mole % thereof is present, hot-melt adhesives are produced which are poor in heat resistance and setting time, hence undesirable. The presence of more than 20 mole % thereof results in the production of adhesives having reduced compatibility, consequently markedly impaired adhesive property, hence undesirable.

Trihydric or more polyhydric alcohol is preferably used as the other starting material, i.e. alcohol, to be esterified with the partially fumarinized rosin and/or partially maleinized rosin in view of the molecular weight and the softening point of the stabilized rosin ester to be produced by subsequent disproportionation reaction. Examples of useful polyhydric alcohols are glycerin, diglycerin, pentaerythritol, dipentaerythritol, etc. Preferred examples are glycerin and pentaerythritol.

The foregoing esterification reaction can be conducted in the same manner as usual esterification. For example, the esterification can be carried out by heating the two components in the presence or absence of a catalyst and with or without a solvent. Suitable solvents include aromatic solvents such as benzene, toluene and xylene. Examples of useful catalysts are acid catalysts such as sulfuric acid, acetic acid and p-toluenesulfonic acid; hydroxides of alkaline earth metals such as calcium hydroxide; metal oxides such as magnesium oxide and calcium oxide; calcium carbonate; magnesium acetate and calcium acetate and like catalysts commonly used for esterification. The amounts of the two components are not particularly limited but can be suitably determined according to the kind and acid value of the partially fumarinized rosin and/or partially maleinized rosin, softening point of the esterification product thus obtained, etc. Generally the amounts thereof are such that the alcohol accounts for 10 to 15 % by weight of the total mixture.

The esterification product obtained above can be disproportionated by various processes heretofore known. More specifically, the esterification product is heated to about 220° to about 300° C. in the presence of a catalyst commonly used for disproportionation.

Useful catalysts for disproportionation include noble metals such as palladium, nickel and platinum; iodine and iodides such as iron iodide; sulfur compounds such as sulfur dioxide and iron sulfide; etc. In this way, the stabilized rosin ester useful in the present invention is prepared. It is critical in this invention to use the stabilized rosin ester with which the contemplated results of the present invention can be achieved. The stabilization of esterification product, which can be achieved by the disproportionation described above, may be also feasible by hydrogenation. However, when used as the tackifying resin, the resin obtained by hydrogenation provides adhesives poor in heat resistance and setting time, and consequently can not be used to accomplish the contemplated results of the present invention. Moreover, the hydrogenation is disadvantageous in respect of economy, ease of reaction, etc., as compared with the disproportionation.

The stabilized rosin ester to be used in the present invention can be prepared by other processes as well as by the foregoing process. For example, a fumarinized or maleinized rosin serving as the starting material is disproportionated, followed by esterification. The disproportionation and esterification in this process can be conducted at the same time. The reaction in these processes can be performed under the same conditions as in the conventional processes, for instance, those to be employed in the known process stated above.

The stabilized rosin ester thus obtained generally has a softening point of 110° to 140° C., preferably 115° to 135° C., a molecular weight of about 1000 to about 1800, preferably about 1100 to about 1500, and an acid value of approximately up to 20 and thus can be suitably used as the tackifying resin of the present invention. The rosin esters having a softening point far below 110° C. or a molecular weight exceedingly lower than 1000 are likely to give adhesives poor in heat resistance and involving delayed setting time. The resins with a softening point much higher than 140° C. or a molecular weight in large excess of 1800 are liable to produce adhesives lower in compatibility, heat resistance, cold resistance, etc. If the resin has an acid value of over 20, no problem is caused, but the resin having too high an acid value tends to provide adhesives with a slightly lower compatibility.

The pressure-sensitive adhesive compositions of the present invention contain the foregoing stabilized rosin ester as the tackifying resin, an ethylene copolymer and wax as main components and can be prepared by heating with stirring these components. The ethylene copolymers useful in this invention are those which are prepared by copolymerizing ethylene with one or more of vinyl monocarboxylates and acrylates and which contain a polar component in an amount of about 10 to about 60% by weight, preferably 15 to 45% by weight, and have a melt index (MI) of 0.1 to 1000, preferably 1 to 500. The term melt index used herein is the number of grams of the resin at 190° C. which can be forced in 10 minutes by a 2160-g force according to ASTMD-1238. Examples of useful waxes are petroleum waxes such as paraffin wax and microcrystalline wax, natural wax, polyethylene wax, polypropylene wax, atactic polypropylene wax, etc. These waxes can be suitably selected according to a particular use of hot-melt adhesives.

The proportions of the ethylene copolymer, wax and stabilized rosin ester present in the hot-melt adhesive composition of this invention are not particularly limited, but can be suitably selected from a wide range depending on the purpose of use and utility of the hot-melt adhesive obtained, etc. For example, when used as the adhesives for papers, films of various plastics, aluminum foil and other materials associated with packaging, the present adhesive composition containing a relatively small amount of ethylene copolymer is formulated and applied by coating methods such as roll coating, gravure coating, dip coating, etc. Generally the present compositions used for these purposes contain 10 to 400 parts by weight of the wax and 20 to 300 parts by weight of the stabilized rosin ester per 100 parts by weight of the ethylene copolymer. In use for work requiring a high degree of adhesion as in woodbonding and bookbinding, use is made of the present composition predominantly containing the ethylene copolymer and stabilized rosin ester so that the composition exhibits outstanding stiffness, flexibility and adhesive property. In this case, the present composition contains 20 to 200 parts by weight, preferably 100 to 130 parts by hydric alcohol and its amount was changed as shown below in Table 1 which also demonstrates the stabilized rosin esters thus obtained.

TABLE 1

| Ref. Ex. | Rosin | Dibasic acid | | Polyhydric alcohol | | Softening point (°C.) | Acid value | Gardner color |
| | | Kind | Amount (mole % relative to rosin) | Kind | Amount (weight % relative to rosin) | | | |
|---|---|---|---|---|---|---|---|---|
| 1 | Gum rosin | Fumaric acid | 2.6 | Pentaerythritol | 11.5 | 114 | 15.6 | 7 |
| 2 | Gum rosin | Fumaric acid | 7.8 | Pentaerythritol | 12.2 | 125 | 16.8 | 6+ |
| 3 | Gum rosin | Fumaric acid | 13.0 | Pentaerythritol | 12.9 | 134 | 18.5 | 7 |
| 4 | Gum rosin | Fumaric acid | 7.8 | Glycerin | 12.9 | 112 | 10.5 | 6 |
| 5 | Gum rosin | Fumaric acid | 17.5 | Glycerin | 15.0 | 132 | 9.5 | 7 |
| 6 | Gum rosin | Maleic anhydride | 7.8 | Pentaerythritol | 12.2 | 126 | 17.5 | 7 |
| 7 | Tall oil resin | Fumaric acid | 10.0 | Pentaerythritol | 12.6 | 122 | 16.7 | 9 | weight, of the stabilized rosin ester and 10 to 100 parts by weight, preferably 20 to 50 parts by weight, of the wax, per 100 parts by weight of the ethylene copolymer.

The present invention will be described below in greater detail with reference to reference examples and working examples to which the invention, however, is limited in no way.

REFERENCE EXAMPLE 1

One hundred parts by weight of gum rosin was placed in a 4-necked flask equipped with a stirrer, a condenser, a water separator and an inlet tube for introducing nitrogen, and the mixture was heated with stirring in an atmosphere of nitrogen to 160° C. to give a molten mass.

One part by weight (2.6 mole % relative to the rosin) of fumaric acid was added to the system, and the resulting mixture was heated with stirring to 220° C. to undergo fumarinization reaction. Thereafter 0.07 part by weight of palladium carbon (5% of palladium supported on carbon and containing 50 % of water) was added and the mixture was maintained at 280° C. for about 3 hours to complete the disproportionation reaction.

The resulting reaction product was filtered in molten state to remove the palladium carbon, giving partially fumarinized, disproportionated rosin. The fumarinization product (100 parts by weight) and pentaerythritol (11.4 parts by weight) were charged into the reactor and the mixture was subjected to esterification in an atmosphere of nitrogen at 285° C. for 12 hours, affording the stabilized rosin ester of the present invention.

The rosin ester thus obtained was found to have a softening point of 114° C., acid value of 15.6 and Gardner color of 7.

REFERENCE EXAMPLES 2-7

The general procedure of Reference Example 1 was repeated except that at least one of the kind of the rosin as the starting material, kind of dibasic acid (fumaric acid or maleic anhydride), their amounts, kind of poly-

EXAMPLE 1

Using the stabilized rosin ester prepared in Reference Example 1, the composition of the present invention (compound) comprising the following components was prepared, and the test piece as stated below was produced by use of the compound.

Components for compound and preparation of test piece

| | Amount (wt. part) |
|---|---|
| EVA #150 (product of Mitsui Polychemical Kabushiki Kaisha, Japan, vinyl acetate content 33%, MI 25) | 20 |
| EVA #220 (product of the same company as above, vinyl acetate content 28%, MI 250) | 20 |
| Tackifying resin | 50 |
| Low-molecular-weight polyethylene wax (m.p. 240° F.) | 10 |

The components were placed in a beaker and thoroughly mixed at 180° C. to give the composition of the present invention. The composition was applied to a piece of aluminum foil to a thickness of 30 μ to produce a test piece.

EXAMPLES 2-7

Using various kinds of stabilized rosin esters prepared in Reference Examples 2 to 7, compounds were prepared in the same manner as in Example 1. Test pieces were produced by the same method as that of Example 1 to evaluate the properties of the hot-melt adhesives.

COMPARATIVE EXAMPLES 1-6

Comparative compounds were prepared in the same manner as in Example 1 except that the tackifying resins as shown below were employed in place of the stabilized rosin ester prepared in Reference Example 1. Test pieces were made by the same method as that of Example 1.

| Comp. Ex. No. | Tackifying Resin | Manufacturer | Trademark | Softening Point (°C.) |
|---|---|---|---|---|
| 1 | C5 aliphatic petroleum resin | Nippon Zeon | Quintone A-100 | 100 |

-continued

| Comp. Ex. No. | Tackifying Resin | Manufacturer | Trademark | Softening Point (°C.) |
|---|---|---|---|---|
| 2 | Pentaerythritol ester of rosin | Arakawa Kagaku Kogyo Kabushiki Kaisha | Pensel A | 100 |
| 3 | Pentaerythritol ester of polymerized rosin | Arakawa Kagaku Kogyo Kabushiki Kaisha | Pensel C | 125 |
| 4 | Pentaerythritol ester of maleinized rosin | Arakawa Kagaku Kogyo Kabushiki Kaisha | Malkyd No. 1 | 125 |
| 5 | Terpene-phenol resin | Yasuhara Yushi | YS Polyster T-130 | 130 |
| 6 | Pentaerythritol ester of disproportionated rosin | — | — | 110 |

COMPARATIVE EXAMPLE 7

The general procedure of Reference Example 1 was repeated using 100 parts by weight of gum rosin and 3 parts by weight of fumaric acid, thereby giving fumarinized rosin. Into an autoclave were placed 107.8 parts by weight of the fumarinized rosin and 0.5 part by weight of diatomaceous earth-nickel (50% of nickel supported on diatomaceous earth) and the mixture was maintained under 200 atmospheres and at 250° C. for 3 hours to complete the hydrogenation reaction. The resulting reaction product was filtered in molten state to remove the diatomaceous earth-nickel, giving partially fumarinized, hydrogenated rosin ester.

Esterification reaction was carried out in the same manner as in Reference Example 1 by using 100 parts by weight of the fumarinization product and 12.2 parts by weight of pentaerythritol, affording partially fumarinized, hydrogenated rosin ester. The rosin ester was found to have a softening point of 116° C., acid value of 17.0 and Gardner color of 8.

A compound was prepared in the same manner as in Example 1 by using the resin obtained above and a test piece was produced using the compound by the same method as in Example 1.

Methods of tests for properties

The compounds and the test pieces prepared in the Examples and Comparative Examples described above were tested for properties of hot-melt adhesives by the following methods.

1. Thermostability

Fifty grams of the compound sample was placed in a 100 cc stainless beaker and was left to stand in an air-circulating oven at 200° C. for 24 hours to observe the degree of coloration and the extent of skinning with unaided eye.

2. Odor

The degree of odor was evaluated by smelling the odor emanating from the compound being mixed at 180° C.

3. Compatibility

The compatibility was evaluated by observing with unaided eye the turbidity of the mixture in preparation of the compound at 180° C.

4. Heat resistance

Another piece of aluminum foil was put on the adhesive surface of the test piece obtained by the foregoing method and heat-sealed at 180° C. under a pressure of 1 kg/cm$^2$ over 1 second.

The test piece (1 in. wide) obtained above was checked for heat resistance by finding out the was checked for heat resistance by finding out the temperature at which the foil piece was peeled off under a load of 200 g at a temperature raised by 5° C./min according to the T-peel method.

5. Setting time

Test pieces were each heat-sealed to substrates respectively of aluminum, wood and corrugated board at 180° C. under a pressure of 1 kg/cm$^2$ over 1 second.

The test piece was peeled off by hand at specific intervals to measure the time taken until no peeling occurred.

6. Cold resistance

The compound was shaped into a sheet 2 mm in thickness and the sheet was left to stand at 5° C. for 3 hours. It was checked whether cracks were caused by folding the sheet under the foregoing conditions.

7. Adhesive property

A piece of aluminum or wood was put on the adhesive surface of each test piece cut to a width of 1 in. and was heat-sealed at 180° C. under a pressure of 1 kg/cm$^2$ over 1 second. The piece was peeled at an angle of 180 degrees and at a velocity of 300 mm /min by a tensile tester.

Table 2 below shows the result thus obtained.

TABLE 2

| | Thermo-stability | Odor | Compati-bility | Setting time (sec) Alum. | Wood | Cor. board | Heat resist-ance (°C.) | Cold resist-ance | Adhesive property (g/25 mm) Alum./alum. | Alum./wood |
|---|---|---|---|---|---|---|---|---|---|---|
| Ex. No. | | | | | | | | | | |
| 1 | ○ | ○ | ○ | 18 | 19 | 19 | 74 | ○ | 2500 | 2800 |
| 2 | ○ | ○ | ○ | 16 | 19 | 18 | 78 | ○ | 2700 | 3000 |
| 3 | ○ | ○ | ○ | 10 | 13 | 12 | 76 | ○ | 2300 | 2700 |
| 4 | ○ | ○ | ○ | 13 | 16 | 15 | 74 | ○ | 2500 | 2700 |
| 5 | ○ | ○ | ○ | 11 | 15 | 13 | 76 | ○ | 2400 | 2700 |
| 6 | ○ | ○ | ○ | 12 | 16 | 15 | 78 | ○ | 2800 | 3000 |
| 7 | ○ | ○~Δ | ○ | 13 | 15 | 14 | 78 | ○ | 2700 | 2900 |
| Comp. Ex. No. | | | | | | | | | | |

TABLE 2-continued

|   | Thermo-stability | Odor | Compati-bility | Setting time (sec) | | | Heat resist-ance (°C.) | Cold resist-ance | Adhesive property (g/25 mm) | |
|---|---|---|---|---|---|---|---|---|---|---|
|   |   |   |   | Alum. | Wood | Cor. board |   |   | Alum./alum. | Alum./wood |
| 1 | X | ○ | X | 20 | 21 | 21 | 60 | X | 500 | 700 |
| 2 | Δ | Δ | ◎ | 23 | 26 | 25 | 61 | ○ | 2500 | 2500 |
| 3 | Δ | Δ | ○ | 21 | 25 | 24 | 72 | ○ | 2700 | 3000 |
| 4 | X | Δ | ○ | 28 | 30 | 30 | 74 | ○ | 2500 | 3000 |
| 5 | ○~Δ | X | ◎ | 19 | 22 | 20 | 61 | X | 2700 | 3100 |
| 6 | ◎ | ○ | ◎ | 25 | 25 | 26 | 61 | ○ | 2400 | 2700 |
| 7 | ◎ | ○ | ◎ | 25 | 27 | 28 | 65 | ○ | 2400 | 2700 |

Note:
◎ Excellent
○ Good
Δ Fair
X No good

We claim:

1. A hot melt adhesive composition containing an ethylene copolymer, wax and a tackifying resin as major components, the composition being characterized in that the tackifying resin is partially fumarinized and/or partially maleinized, disproportionated rosin ester.

2. A composition as defined in claim 1 wherein the tackifying resin is fumarinized or maleinized at a ratio of 1.3 to 20 mole % based on the rosin.

3. A composition as defined in claim 2 wherein the tackifying resin is fumarinized or maleinized at a ratio of 2.6 to 13 mole % based on the rosin.

4. A composition as defined in claim 1 wherein the tackifying resin is an ester of polyhydric alcohol.

5. A composition as defined in claim 4 wherein the polyhydric alcohol is glycerin or pentaerythritol.

6. A composition as defined in claim 1 wherein the tackifying resin has a softening point of 110° to 140° C.

7. A composition as defined in claim 6 wherein the tackifying resin has a softening point of 115° to 135° C.

8. A composition as defined in claim 1 wherein the tackifying resin has a molecular weight of 1000 to 1800.

9. A composition as defined in claim 8 wherein the tackifying resin has a molecular weight of 1100 to 1500.

10. A composition as defined in claim 1 wherein the ethylene copolymer is a copolymer of ethylene and at least one of vinyl monocarboxylate and acrylate, the copolymer containing 10 to 60% by weight of a polar component.

11. A composition as defined in claim 10 wherein 15 to 45% by weight of the polar component is contained.

12. A composition as defined in claim 1 wherein the ethylene copolymer, wax and tackifying resin are used in a ratio ranging from 100:10:20 to 100:400:300.

13. A composition as defined in claim 1 wherein the ethylene copolymer, wax and tackifying resin are used in a ratio ranging from 100:10:20 to 100:100:200.

14. A composition as defined in claim 1 wherein the ethylene copolymer, wax and tackifying resin are used in a ratio ranging from 100:20:100 to 100:50:130.

* * * * *